July 17, 1956  R. S. GANS  2,754,602

DEVICE FOR REMOVING SNOW

Filed Nov. 19, 1952  3 Sheets-Sheet 1

INVENTOR.
ROBERT S. GANS
BY
Barnes, Kisselle, Laughlin & Raisch
ATTORNEYS.

July 17, 1956 R. S. GANS 2,754,602
DEVICE FOR REMOVING SNOW
Filed Nov. 19, 1952 3 Sheets-Sheet 2

INVENTOR.
ROBERT S. GANS
BY
Barnes, Kisselle, Laughlin & Raisch
ATTORNEYS.

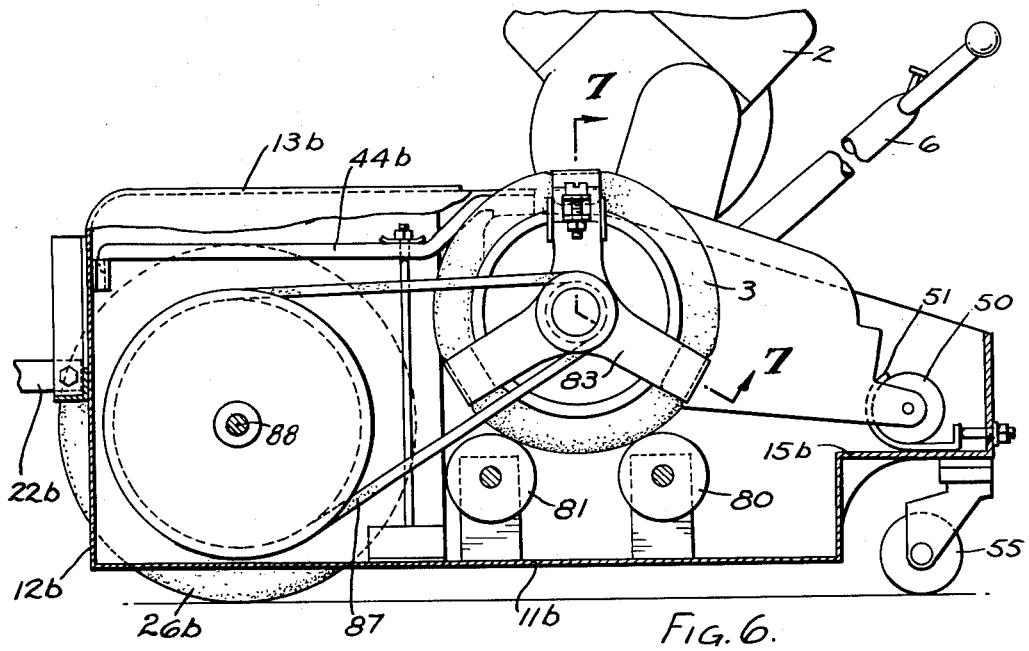
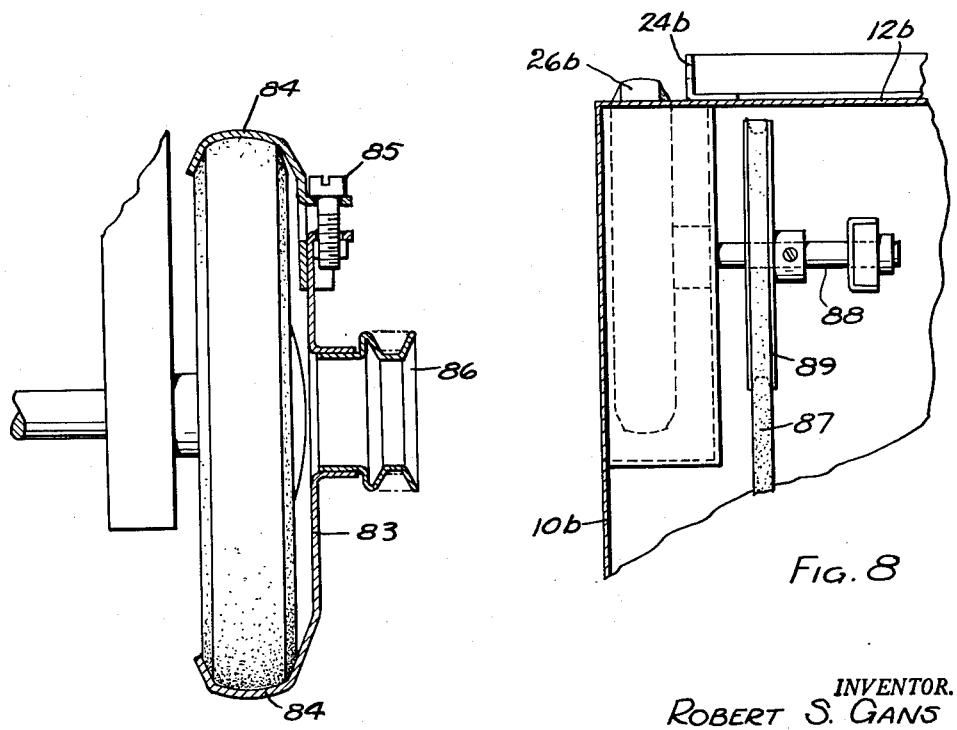

United States Patent Office 2,754,602
Patented July 17, 1956

2,754,602

DEVICE FOR REMOVING SNOW

Robert S. Gans, Birmingham, Mich.

Application November 19, 1952, Serial No. 321,475

4 Claims. (Cl. 37—53)

This invention relates to a device for the removal of snow from such areas as walks, driveways and the like.

As is well known to many, the chore of shoveling snow is a difficult one which might be said to involve, in plain language, a lot of hard work. Many people, and particularly those up in years, impair their health shoveling snow and on many occasions competent advice is that a person up in years should not undertake the chore at all.

Nevertheless, snow must be removed from driveways and walks to make them useful and, indeed, many municipalities have ordinances requiring the removal of snow. Of course, in many geographical locations, the chore of removing snow is necessary only on occasions, and most people are unprepared. Since snow removal is necessary only throughout the winter months, and then sometimes only at spaced intervals, it is not economically sound for a resident in the city or homeowner to invest in any sort of a power mechanism having the limited purpose of removing snow.

The object of this invention is to provide a device or apparatus to which a separate and distinct power unit may be applied for use in removing snow. Throughout the various cities and municipalities, many people who are homeowners or otherwise rent or lease homes for residential purposes possess power operated lawn mowers. Here is a power unit useful largely throughout the summer or grass growing season but useless in the winter. This invention aims to provide a device which is not a power unit in itself but to which a conventional power lawn mower may be applied for supplying power to the device. Thus the combination of the device and the power lawn mower provides a power operated snow removing mechanism, and also provides a use for the power mechanism of a lawn mower throughout the winter season where it would otherwise be idle.

I am aware of the fact that heretofore, snow removing devices embodying supporting wheels have been proposed; that power operated devices constructed for the one purpose of removing snow have been proposed; that involved structures for the dual purpose of mowing and removing snow have been proposed. However, my invention involves the adaptation of the existing power lawn mower to a separate snow removing device.

The invention is disclosed in the accompanying drawings:

Fig. 6 is a side elevational view with some parts cut away and some parts in section showing a modified form of the invention.

Fig. 7 is an enlarged cross sectional view taken on line 7—7 of Fig. 6 showing adapting features.

Fig. 8 is a view partially in plan and partially in section showing the traction wheel of the structure shown in Fig. 6.

Figure 1:
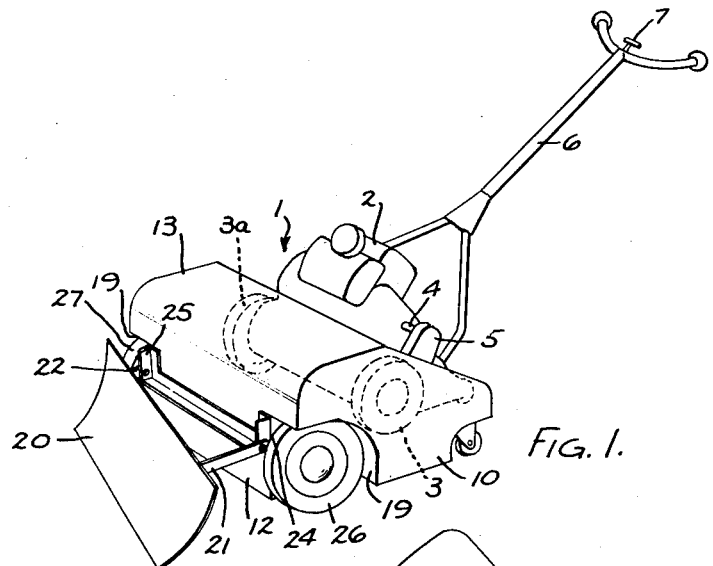
Fig. 1 is a perspective view with some parts shown in dotted lines illustrating the device of the present invention and showing a power lawn mower applied thereto.

In Fig. 1 a conventional power operated lawn mower is generally illustrated at 1, the same having a power unit 2 which may include an internal combustion engine, fuel tank, etc., the wheels of the lawn mower being illustrated at 3 and 3a. They are driven by a shaft 4 which may operate through a chain enclosed in a cover 5. The lawn mower has a handle 6 and suitable controlling means as indicated at 7 for the engine and mechanism. It is to be understood, of course, that the conventional rotating reel for cutting grass lies between the two ground wheels 3 and 3a.

The snow removal unit comprises a body, the exterior of which may be formed of sheet metal having side walls 10, a bottom wall 11, a front wall 12, the top part of which may be fashioned to provide a partial top wall 13. The bottom wall may have an inset portion 15 and the rear may have only a short wall or flange like structure 16. This structure leaves an opening between the side walls 10 and between the top wall portion 13 and the back portion 16 into which the body of the power lawn mower may be placed as shown in Fig. 1. The front wall and the side walls are formed as shown in Fig. 1, on each side thereof and at the front to form a wheel housing defined and enclosed by the housing element or plate 19.

Mounted at the front of the front wall 12 is a plate or snow plow element 20. This plate may have any desired shape for conveniently and efficiently pushing or removing the snow, and as shown herein, the plate is a simple concaved form angularly disposed. It has a relatively long support or bracket 21 on one side and a shorter bracket 22 on the opposite side bolted or otherwise secured to supporting brackets 24 and 25 secured to the front of the body structure.

Figure 3:
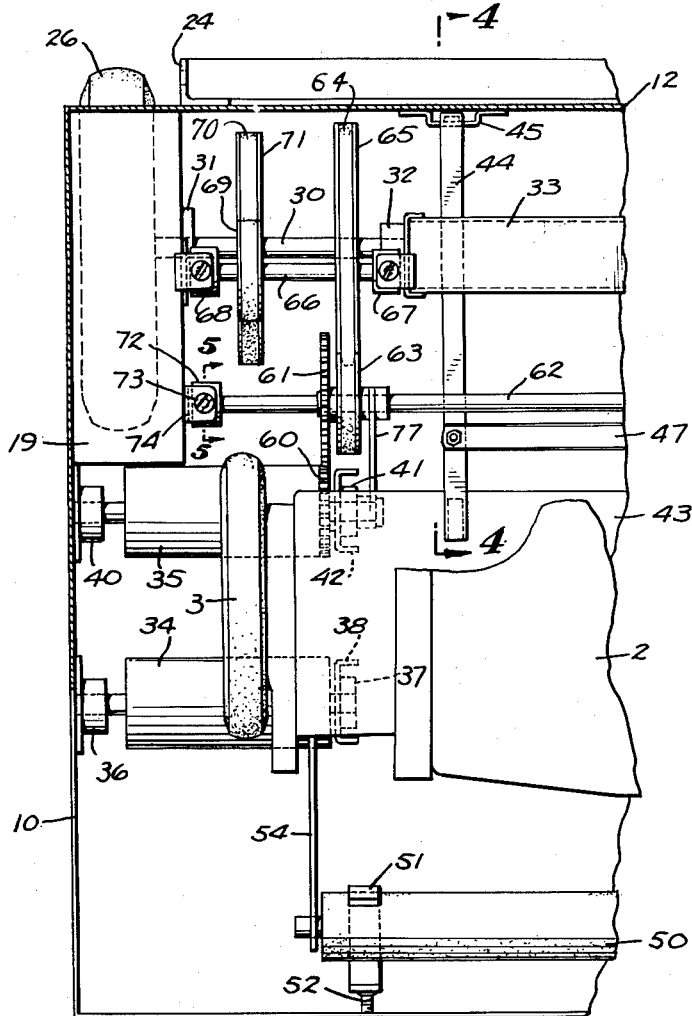
Fig. 3 is a partial plan view with some parts cut away and some parts shown in section illustrating a power mower and the snow removal unit to which it is applied.

Suitable traction wheels 26 and 27 are disposed in the wheel housings. Each wheel 26 and 27 is mounted upon a stub shaft 30. In Fig. 3 the mounting of the wheel 26 is shown as is also driving mechanism therefor, and it will be understood that the opposite wheel is similarly mounted. The shaft 30 is mounted in a bearing 31 and in a bearing 32 carried by a bracket 33 carried by the housing.

Figure 2:
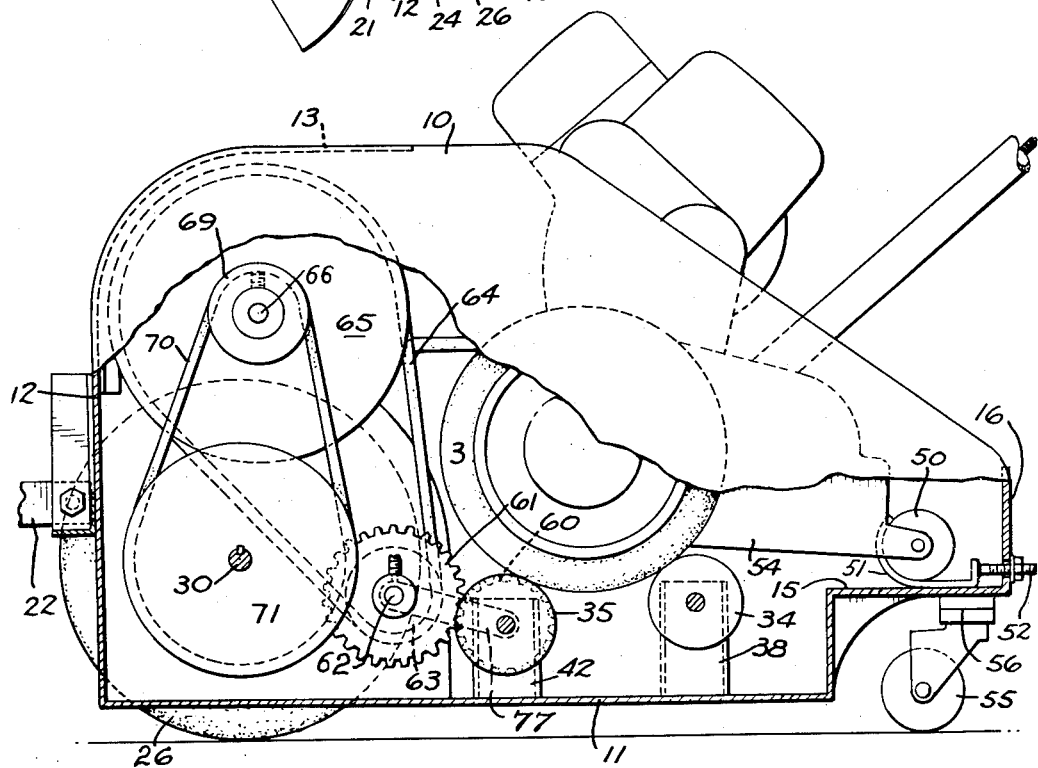
Fig. 2 is an enlarged view partly in side elevation and partly in section showing features of the invention.

Within the housing are two rollers 34 and 35 arranged so that a wheel 3 of the lawn mower may rest thereon. The roller 34 is journalled in a bearing 36 carried by the side plate 10 and a bearing 37 carried by a bracket 38 mounted on the bottom wall 11 (Fig. 2). The roller 35 is journalled in the bearing 40 and in a bearing 41 carried by bracket 42 carried by the bottom wall (Fig. 2). Again we might say that there are similar rollers for the wheel 3a of the lawn mower positioned at the opposite side of the device.

Figure 4:
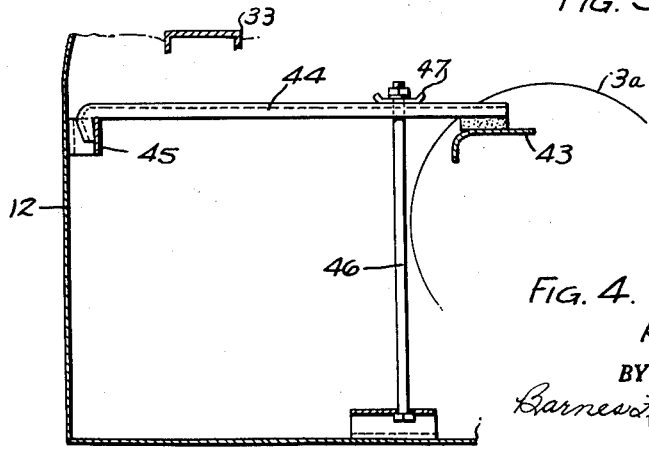
Fig. 4 is a view taken substantially on section line 4—4 of Fig. 3 showing a holding bracket structure.

The lawn mower, as usual, has a cover plate 43 positioned between the wheels 3 and 3a and overlying the reel and the lawn mower may be securely held in position by clamps 44 overlying the plate 43 at one end, each engaging a bracket 45 carried by the front wall 12 and held down by tie rods 46 (Fig. 4). Two clamps may be used and they may be connected by a connector element 47.

The lawn mower may further be held in position through the means of its trailing roller 50 by one or more hooks 51 engaging the roller and tightened by a screw and nut arrangement 52. The lawn mower, as will be appreciated by a consideration of Fig. 2, is thus clamped in position with its wheels 3 and 3a held against the rollers 34 and 35 and with the weight of the trailing roller 50 carried by the portion 15 of the bottom wall. The ground engaging wheels 26 are, of course, outside of the housing for engaging the ground, walk, driveway or the like. The trailing roller 50, as shown in Figs. 2 and 3, is carried by an extending portion 54 of the body of the lawn mower.

The rear end of the housing is supported by casters as shown in Figs. 1 and 2, there being a caster at each rear corner and each positioned under a wall section 15. The caster roller is illustrated at 55 with its journal mounting at 56.

The roller 35 is provided with a gear 60, the teeth of which mesh with those of the gear 61 mounted on a shaft 62, and also mounted on the shaft is a pulley 63. Operating over this pulley is a belt 64 which runs over a relatively large pulley 65, keyed to a shaft 66, journalled as in supports 67 and 68 carried by the housing. Also keyed to this shaft is a pulley 69 over which operates a belt 70 and which operates over a pulley 71 keyed to the stub shaft 30. Thus, considering Fig. 2, rotation of the wheel 3 in a forward or counterclockwise direction, rotates the roller 35 which, through the gears, rotates pulley 63 and through the other pulleys and belts described, the wheel 26 of the snow removal unit is caused to be driven in the same direction as that of the wheel 3.

Figure 5:
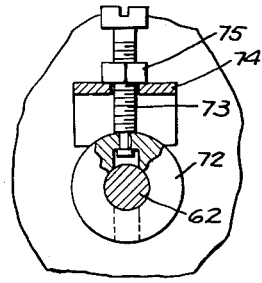
Fig. 5 is an enlarged sectional view taken on line 5—5 of Fig. 3 showing an adjustable feature.

It will be seen, therefore, that one wheel of the lawn mower drives one traction wheel of the unit and the other wheel of the lawn mower through a similar mechanism drives the opposite traction wheel of the unit. Since the two traction wheels of the lawn mower are interconnected through a conventional ratchet structure or differential structure, so that the lawn mower may be turned through an arc, the two traction wheels of the snow removal unit are thus similarly connected. In this manner the apparatus takes advantage of the existing structure in the lawn mower to drive the traction wheels in a differential manner so that the unit may be operated in a curve and turned. Various bearings for the pulleys may be adjusted for tightening the belts and one such arrangement is shown in Fig. 5. Here the shaft 62 is shown in one of its bearings 72, and the bearing is held adjustably by a screw threaded member 73 which may be raised or lowered relative to a bracket 74 and held positioned by a nut 75. Similar bearings are used for the stub shaft 66. When the shaft 62 is thus adjusted it is held properly spaced relative to the axis of the roller 35 for the proper meshing of the teeth of the gears by means of a link 77. The rollers 34 and 35 have some considerable axial extent so as to receive lawn mowers of various widths.

In use, the power lawn mower is mounted as described and the engine started. The power is thus delivered to the traction wheels of the unit so that the unit may be manipulated to cause the plate 20 to push and remove snow. The lawn mower handle serves as a handle for the combined unit. Some small power mowers require considerable torque reduction because of the smallness of their motor and this is accomplished by the belting arrangement shown in Fig. 2. Moreover, the traction wheels 26 are larger than those of the lawn mower and thus provide better and adequate traction. The wheels of some lawn mowers are too small for this purpose. Moreover, the lawn mower is completely housed and thus the reel and other mechanism are protected from the snow.

In the modified form shown in Figs. 6, 7 and 8, identical parts have the same reference characters applied and corresponding parts have the same reference characters with the addition of the letter b. In this form there is a more direct drive. The lawn mower is clamped in position and the wheels thereof rest upon rollers 80 and 81. A spider structure 83 having hook portions 84 is applied to the wheel 3 and clamped thereto by means of a clamping screw 85. This spider structure has a pulley 86 thereon for an operating belt 87. The wheel 26b is mounted on a stub shaft 88 and the belt 87 operates over a pulley 89 fixed to the shaft for driving the ground engaging wheel 26b. Both wheels of the lawn mower are similarly coupled to the opposite traction wheels of the device.

The structure which can thus be adapted to power lawn mowers can be economically produced as it has no power means in itself. The power mower can be easily and quickly clamped into position for use in removing the snow. The power mower may be easily detached for use for mowing purposes during the grass growing season and the snow handling unit stored. Since the power mower and all its parts, including the reel, are protected from the snow, these parts do not become wet nor are they otherwise damaged during use of the power mower with the device.

I claim:

1. An apparatus for the removal of snow comprising, a housing having a front wall, side walls, top and bottom walls, the bottom wall extending entirely to the rear of the housing and the top wall extending partially to the rear of the housing, whereby the housing is open at its upper rear portion, two independently mounted traction wheels outside the housing positioned adjacent opposite side walls and near the front wall, an axis member for each traction wheel extending through the adjacent side wall and into the housing, supporting wheel means at the rear of the housing, snow removal means secured to the housing and disposed outside of and forwardly of the front wall, said housing adapted to receive a lawn mower having an engine and engine driven wheels in a position so that the wheels thereof are within the housing and with the lawn mower lying partially within the opening in the housing with the handle of the lawn mower projecting upwardly and rearwardly to serve as a handle for the housing, independently mounted supporting roller means in the housing upon which each wheel of the lawn mower is adapted to rest, means for clamping the lawn mower in said position in the housing, whereby each wheel of the lawn mower may turn on its roller supporting means when driven by the lawn mower engine, and a power transmitting means for transmitting the torque from each wheel of the lawn mower to the axis means of one of the said traction wheels of the housing.

2. The apparatus as described in claim 1 characterized in that each power transmitting means is permanently mounted in the housing and respectively interconnects a supporting roller means of one of the lawn mower wheels and the axis means of the adjacent traction wheel on the housing.

3. The apparatus as recited in claim 1 characterized in that the supporting wheel means at the rear of the housing is in the form of caster wheel means.

4. The apparatus as described in claim 1 characterized in that each power transmitting means comprises a pulley adapted to be secured to a wheel of the mower, a pulley mounted on the axis of the respective traction wheel, and a belt operating over said pulleys.

References Cited in the file of this patent

UNITED STATES PATENTS

| Number | Name | Date |
|---|---|---|
| 1,080,673 | Belanger | Dec. 9, 1913 |
| 1,180,476 | Cook et al. | Apr. 25, 1916 |
| 1,286,846 | Wales | Dec. 3, 1918 |
| 1,301,294 | Morris | Apr. 22, 1919 |
| 1,424,878 | Canfield | Aug. 8, 1922 |
| 1,495,726 | Cook et al. | May 27, 1924 |
| 1,866,380 | Wagner | July 5, 1932 |
| 1,885,611 | Lilley | Nov. 1, 1932 |
| 2,354,576 | Clark | July 25, 1944 |
| 2,476,526 | Badlat | July 19, 1949 |
| 2,535,254 | Attwell | Dec. 26, 1950 |
| 2,695,071 | Hupp | Nov. 23, 1954 |

FOREIGN PATENTS

| Number | Country | Date |
|---|---|---|
| 571,803 | France | May 23, 1924 |